(12) United States Patent
Thakur

(10) Patent No.: US 8,821,817 B2
(45) Date of Patent: *Sep. 2, 2014

(54) RARE EARTH RECOVERY FROM PHOSPHOR

(71) Applicant: REEnewal Corporation, Pleasanton, CA (US)

(72) Inventor: Narayan V. Thakur, San Jose, CA (US)

(73) Assignee: REEnewal Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/949,899

(22) Filed: Jul. 24, 2013

(65) Prior Publication Data

US 2013/0309150 A1 Nov. 21, 2013

Related U.S. Application Data

(63) Continuation of application No. 13/714,276, filed on Dec. 13, 2012, now Pat. No. 8,524,176.

(60) Provisional application No. 61/685,684, filed on Mar. 21, 2012, provisional application No. 61/630,684, filed on Dec. 15, 2011.

(51) Int. Cl.
*C01F 17/00* (2006.01)
*C22B 59/00* (2006.01)

(52) U.S. Cl.
CPC .............. *C22B 59/00* (2013.01); *C01F 17/0006* (2013.01); *C01P 2006/80* (2013.01); *C01F 17/0043* (2013.01)
USPC .......................... 423/21.1; 423/21.5; 423/263

(58) Field of Classification Search
None
See application file for complete search history.

(56) References Cited

U.S. PATENT DOCUMENTS 3,453,069 A 7/1969 Sherrington et al.
4,650,652 A 3/1987 Naitou et al.
(Continued)

FOREIGN PATENT DOCUMENTS

JP 08-333641 12/1996
JP 2000-087154 3/2000
(Continued)

OTHER PUBLICATIONS

U.S. Appl. No. 13/714,276, Office Action mailed May 22, 2013.
(Continued)

*Primary Examiner* — Steven Bos
(74) *Attorney, Agent, or Firm* — Weaver Austin Villeneuve & Sampson LLP

(57) ABSTRACT

A method is described to produce high purity rare earth oxides of the elements La, Ce, Tb, Eu and Y from phosphor, such as waste phosphor powders originating in various consumer products. One approach involves leaching the powder in two stages and converting to two groups of relatively high purity mixed rare earth oxides. The first group containing Eu and Y is initially separated by solvent extraction. Once separated, Eu is purified using Zn reduction with custom apparatus. Y is purified by running another solvent extraction process using tricaprylmethylammonium chloride. Ce is separated from the second group of oxides, containing La, Ce and Tb by using solvent extraction. Subsequently, La and Tb are separated from each other and converted to pure oxides by using solvent extraction processes. A one-stage leaching process, wherein all rare earths get leached into the solution and subsequently processed, is also described.

31 Claims, 14 Drawing Sheets

(56) References Cited

U.S. PATENT DOCUMENTS

| | | |
|---|---|---|
| 7,976,798 B2 | 7/2011 | Otto et al. |
| 8,137,645 B2 | 3/2012 | Porob et al. |
| 8,524,176 B2 * | 9/2013 | Thakur .................. 423/21.1 |
| 2010/0166634 A1 | 7/2010 | Rosenkilde |
| 2012/0070351 A1 | 3/2012 | Braconnier et al. |
| 2013/0156660 A1 | 6/2013 | Thakur |

FOREIGN PATENT DOCUMENTS

| | | |
|---|---|---|
| JP | 2003-160783 | 6/2003 |
| JP | 2004-285467 | 10/2004 |
| WO | 03/104149 | 12/2003 |

OTHER PUBLICATIONS

U.S. Appl. No. 13/714,276, Notice of Allowance mailed Jun. 26, 2013.
English translation of JP08-333641, Dec. 1996.
WO patent application No. PCT/US2012/069913, International Search Report and Written Opinion mailed Apr. 24, 2013.
JPO machine translation into English of JP patent publication No. 2004-285467.
JPO machine translation into English of JP patent publication No. 2000-087154.

* cited by examiner

RARE EARTH RECOVERY FROM PHOSPHOR

CROSS-REFERENCE TO RELATED APPLICATIONS

This application is a continuation of U.S. patent application Ser. No. 13/714,276 filed Dec. 13, 2012, titled RARE EARTH RECOVERY FROM PHOSPHOR, now pending, which claims priority to U.S. Provisional Patent Application No. 61/685,684 filed Mar. 21, 2012, titled EFFICIENT AND AUTOMATED METHOD FOR RECOVERING RARE EARTHS FROM WASTE PHOSPHOR POWDERS; and U.S. Provisional Patent Application No. 61/630,684, filed Dec. 15, 2011, titled RECYCLING OF RARE EARTHS FROM WASTE PHOSPHOR POWDERS; the disclosures of which are incorporated herein by reference in their entirety and for all purposes.

BACKGROUND OF THE INVENTION

1. Field of the Invention

The present invention relates to the technical field of rare earth element (REE) production. More particularly, the present invention relates to rare earth constituents from phosphor, such as waste phosphor powders.

2. Description of Related Art

The conventional process for the production of rare earth elements (REEs) is through a mining process, wherein the mineral ore is processed through multiple steps to produce the REE. This is an expensive and time-consuming process due to the presence of several REEs in the ore, some of which may be in very low concentrations, thereby requiring additional concentration steps. Also, most mineral ores for REE have radioactive elements, such as Uranium and/or Thorium, which require very careful handling. Further, this process is environmentally taxing due to the generation of large amounts of waste by-products, some of which are toxic.

Rare earth containing phosphor powders are used in a variety of products such as fluorescent lamps, cathode ray tube (CRT) displays, plasma displays and light emitting diodes (LED). The most commonly used REE found in these phosphors are Lanthanum (La), Cerium (Ce), Europium (Eu), Terbium (Tb) and Yttrium (Y). In addition to the REE, these powders may contain Calcium (Ca), Barium (Ba), Strontium (Sr), Aluminum (Al), Mercury (Hg), Lead (Pb), Zinc (Zn), etc., in the elemental form or as oxides or phosphates. The REE Gadolinium (Gd) may also be found in some phosphors, particularly those derived at least in part from compact fluorescent bulb waste. When these products reach end-of-life, they are classified as electronic waste (e-waste) and sent to designated recycling centers. While the other parts of the products may be recovered, the waste phosphor powders have typically been sent to a landfill with no effort made to reclaim the rare earths from the waste material.

SUMMARY OF THE INVENTION

The present invention provides efficient and effective methods for recovering rare earth constituents as oxides from phosphors, such as waste phosphor powders. Mixed REE oxides of greater than 95% purity, for example about 99% purity, and individual rare earth oxides of greater than 99% purity, such as up to 99.9%, or up to or at least 99.99% purity may be obtained by the processes of the invention, without any toxic waste by-products.

A method for recovery of a rare earth constituent from a phosphor is disclosed. A suitable phosphor starting material is a powder, such as a phosphor powder derived from phosphor waste. The rare earth constituent can include compounds having a rare earth element selected from the group consisting of La, Ce, Eu, Tb, Y and combinations thereof. In some cases, the rare earth constituent can include Gd-containing compounds.

The method includes leaching a rare earth constituent from a phosphor to form a rare earth leachate solution; adjusting the rare earth leachate solution to a pH of about 2, and then precipitating the rare earth constituent from the rare earth leachate solution as one or more rare earth oxalates; and converting the one or more rare earth oxalates to one or more rare earth oxides. By this method, the one or more rare earth oxides can be obtained greater than 95% pure, for example about 99% pure.

The leaching may involve a single stage of leaching La, Ce, Eu, Tb and Y-comprising compounds from the phosphor by concentrated $H_2SO_4$, for example about 36N $H_2SO_4$.

Alternatively, the leaching may involve a first stage of preferentially leaching Eu and Y-comprising compounds from the phosphor by dilute $H_2SO_4$ (e.g., 6N $H_2SO_4$) to form a Eu and Y leachate, while La, Ce and Tb-comprising compounds from the phosphor are preferentially retained in an un-leached residue. Then, a second stage of preferentially leaching La, Ce and Tb-comprising compounds from the un-leached residue of first stage by concentrated $H_2SO_4$ (e.g., 36N $H_2SO_4$) to form a La, Ce and Tb leachate.

In various embodiments, the method can further include further separation and purification of individual rare earth oxides by solvent extraction or Zn reduction to achieve a high purity of greater than 99% purity, such as up to 99.9%, or up to or at least 99.99%. Separation of high purity Y from the high purity mixture of Eu and Y oxides can be achieved by solvent extraction with a solvent system comprising a solvent selected from the group consisting of Di-(2-ethylhexyl)phosphoric acid in dilute $H_2SO_4/HCl/HNO_3$, 2-ethylhexyl 2-ethylhexyl phosphonic acid in dilute $H_2SO_4/HCl/HNO_3$, and combinations thereof. Purification of Y oxide to at least 99.99% purity can be achieved by using solvent extraction with tricaprylmethylammonium chloride.

Purification of Eu oxide to greater than 99% purity, such as up to 99.9%, or up to or at least 99.99% purity can be achieved by Zn reduction from a mixture of Eu and Y traces after separation of Y. In this regard, a custom Zn reduction apparatus is provided and may be used. The apparatus includes a column packed with zinc granules; a receptacle for collecting eluent from the column; and an inlet and an outlet on the receptacle configured for passing gaseous nitrogen through the receptacle. The apparatus is configured and operated to achieve commercial scale Zn reduction for purification of Eu oxide to greater than 99% purity, such as up to 99.9%, or up to or at least 99.99%.

Separation of greater than 99% purity, such as up to 99.9%, or up to or at least 99.99% high purity Ce oxide from the mixture of oxides of La, Ce and Tb can be achieved by solvent extraction with a solvent system comprising a solvent selected from the group consisting of Di-(2-ethylhexyl)phosphoric acid, 2-ethylhexyl 2-ethylhexyl phosphonic acid, tributyl phosphate, and combinations thereof.

Separation of greater than 99% purity, such as up to 99.9%, or up to or at least 99.99% high purity La and Tb can be achieved by solvent extraction with a solvent system comprising a solvent selected from the group consisting of Di-(2-ethylhexyl)phosphoric acid, 2-ethylhexyl 2-ethylhexyl phosphonic acid, and combinations thereof, after separation of Ce.

The processes and results described herein can be practiced and achieved without caustic fusion of the phosphor or an alkaline or acidic digestion step between leaching and precipitating.

These and other features of the invention are further described and exemplified in the detailed description below.

DETAILED DESCRIPTION OF SPECIFIC EMBODIMENTS

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order to not unnecessarily obscure the present invention.

While some processes for the separation and purification of rare earth elements are known, they are primarily limited to the context of mining operations and generally small, laboratory-scale operations. More recently, efforts to recover rare earths from waste phosphors have been proposed. These include methods that make use of caustic fusion to decompose the phosphor into a mixture of hydroxides prior to further techniques to extract, treat and separate rare earth constituents. An alternative method includes a plurality of leaching steps followed by an alkaline or acidic digestion. The present invention provides efficient and effective processes and systems for the recovery of rare earths from phosphors, such as from waste streams. The methods and systems of the invention can achieve high purity separations of individual rare earths and are scalable to an industrial level.

Processes in accordance with the present invention may be used to recover rare earths from phosphors, such as are obtained from hazardous or non-hazardous waste materials. While it is not so limited, the invention will generally be described in the context of recovering rare earths from waste phosphor materials, such as lamp waste.

Hazardous metals, such as mercury (Hg) and lead (Pb), in waste phosphor materials that contains them need to be effectively captured and separated from the rest of the waste prior to the recovery of rare earths. Such a pre-processing operation is illustrated and described with reference to FIG. 1.

Figure 1:
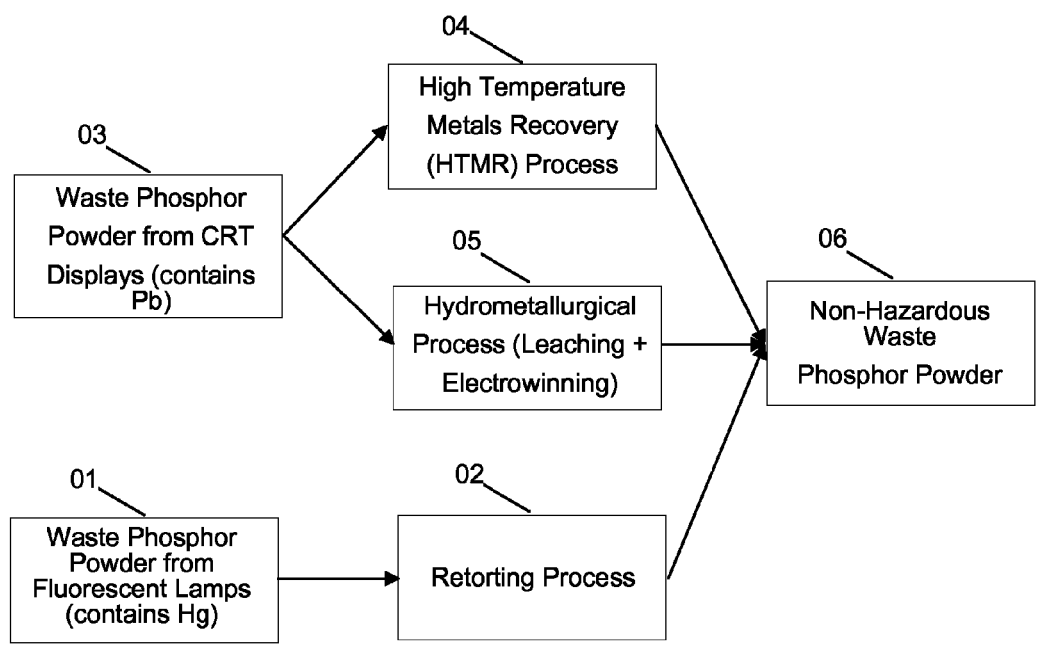
FIG. 1 is a process flow depicting an optional pre-processing operation for a hazardous waste material.

Referring to FIG. 1, Mercury (Hg) 01 is typically a constituent in the waste phosphor powder from fluorescent lamps and can be removed by subjecting the phosphor powder to a retorting process 02. This is a process which recovers the mercury primarily by volatilization from the solid powder and subsequent collection and condensation of the volatilized component. Typical temperature of operation is 350° C. to 850° C. with a typical process time of about 4 to 20 hours.

Still referring to FIG. 1, Lead (Pb) 03 is a typical constituent in CRT displays and, due to its higher boiling point (1749° C.), can be removed by a high temperature metals recovery (HTMR) process 04. In an HTMR process for lead recovery, the phosphor powder is mixed with a fluxing agent to preferentially target lead volatilization, and fed to a furnace where it is heated to 1300° C. to 2000° C. resulting in the reduction and volatilization of the lead. In another embodiment of this optional aspect of the invention, lead may also be separated through a hydrometallurgical process 05, wherein the lead is leached in a suitable lixiviant with high solubility for lead, such as fluosilicic acid ($H_2SiF_6$), fluoboric acid ($HBF_4$), ammoniacal ammonium sulfate or concentrated chloride solutions. Subsequently, the lead may be recovered using an electrowinning process in which a current is passed from an inert anode through the leach solution so that the metal is extracted as it is deposited in an electroplating process onto the associated cathode. The end product of this optional pre-processing operation is a non-hazardous waste phosphor powder 06.

Whether obtained as a non-hazardous material, or as a hazardous metal-containing material subjected to pre-processing to remove hazardous metals, an initial stage in the recovery of rare earths from a non-hazardous phosphor waste material that is free of hazardous contaminants involves leaching out the rare earths present in the phosphor powder and bringing these into solution.

Figure 2:
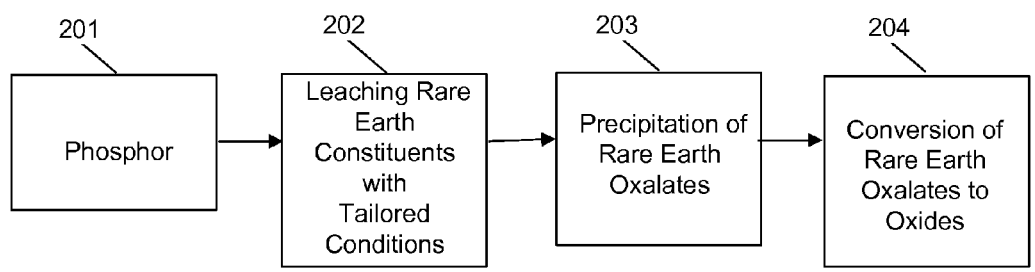
FIG. 2 is a process flow depicting a general overview of rare earth recovery from phosphor in accordance with the invention.

Referring now to FIG. 2, a general process flow for processing a phosphor, e.g., a non-hazardous phosphor powder such as may be obtained from the process described with reference to FIG. 1 above, to leach rare earth constituents in accordance with the invention is illustrated. The process involves a method for recovery of a rare earth constituent from a phosphor (201), e.g., a non-hazardous phosphor powder, including the following operations: leaching a rare earth constituent from a phosphor to form a rare earth leachate solution (202); adjusting the rare earth leachate solution to a pH of about 2, and then precipitating the rare earth constituent from the rare earth leachate solution as one or more rare earth oxalates (203); and converting the one or more rare earth oxalates to one or more rare earth oxides (204). This general process may be practiced in different ways that incorporate these features.

These leaching and precipitating operations are conducted with conditions tailored to preferentially extract rare earths, so that subsequent operations are conducted on already relatively high purity rare earth material, such as greater than 50% pure, or greater than 75% pure, or greater than 90% pure, and particularly greater than 95% pure, for example about 99% pure. Percent purity of rare earth oxalates or oxides herein is measured relative to non-rare earth metal oxalates or oxides in the relevant product. In particular, preferentially precipitating a rare earth constituent from rare earth leachate solution as one or more rare earth oxalates can be achieved by adjusting the rare earth leachate solution to a pH preferential to the precipitation of rare earth oxalates relative to other metal oxalates, and then precipitating the rare earth constituent from the rare earth leachate solution as one or more rare earth oxalates. This can be achieved by adjusting the rare earth leachate solution to a pH of about 2, and then precipitating the rare earth constituent. Thereafter, the rare earth oxalates greater than 95% pure, such about 99% pure rare earth oxides measured relative to non-rare earth metal oxides in the relevant product. This results in improved yield and efficiency in obtaining purified rare earth products.

Following the general procedure described with reference to FIG. 2, additional separations and purifications can be conducted to obtain high purity (e.g., greater than 99% purity, such as up to 99.9%, or up to at least 99.99%) individual rare earths, for example as detailed below.

Returning to FIG. 2, starting with a phosphor, e.g., a non-hazardous phosphor powder at 201, a suitable lixiviant or a combination of lixiviants can be used to preferentially dissolve the rare earth compounds in the phosphor, while keeping most of the non-rare earths insoluble at 202. For example, as described further below, the general process in accordance with the present invention may be practiced as a single stage leaching La, Ce, Eu, Tb and Y-comprising compounds from the phosphor. The leaching conditions are tailored (e.g., optimized) for maximum extraction (e.g., greater than 95% extraction efficiency and purity) through adjusting the lixiviant composition, temperature, leaching time, rate of stirring and liquid to solid ratio. Whereas, several different acid types or mixtures may be used for leaching out rare earths, such as sulfuric acid ($H_2SO_4$), nitric acid ($HNO_3$), hydrochloric acid (HCl), aqua regia (3 HCl+1 $HNO_3$), etc., embodiments of the present invention focus on the use of $H_2SO_4$ as the leaching medium as it has been found to provide significant performance benefits over other lixiviants.

The representative values for the process parameters are as follows: process temperature of about 25° C.-200° C., for example 25, 50, 100, 125, 150, 175 or 200° C., or any discrete temperature in this range; leaching time of up to 4 hours or more, for example about 2 to 4 hours, such as 2, 3 or 4 hours or any discrete time period in this range; rate of stirring of up to 500 rpm or more, for example about 100 to 500 rpm, such as about 100, 200, 300, 400 or 500 rpm or any discrete stirring rate in this range; and liquid to solid ratio of about 3-8. The acid strengths used can vary from about 4N all the way up to 36N. Further, hydrogen peroxide ($H_2O_2$), manganese dioxide ($MnO_2$) and sodium chloride (NaCl) may be used in conjunction with some of the acids to break down the rare earth metal phosphates and enable them to get into solution.

In another embodiment of the invention, a multi-step leaching process may be implemented sequentially, wherein, a lixiviant or combination thereof, from the foregoing list, with certain operating parameters is used first to dissolve a subset of the rare earths of interest in the first step. In the subsequent step a lixiviant is chosen from the same list with different operating parameters can be used to dissolve the remainder of the rare earths that were left in the residue in the previous step. For example, as described further below, in a two-stage implementation of the invention the leaching may include a first stage of preferentially leaching of Eu and Y-comprising compounds and a second stage of preferentially leaching of La, Ce and Tb-comprising compounds. The main benefit of this approach is to simplify the downstream processing pertaining to the separation of specific rare earth elements.

Following the leaching, a series of process steps are performed in order to separate the constituent rare earths from each other and produce greater than 99% purity, such as up to 99.9%, or up to at least 99.99% pure individual rare earth oxides of each of La, Ce, Eu, Tb and Y.

Referring to FIG. 2 again, once the rare earth compounds are leached into the solution phase, the leached rare earths are precipitated as rare earth oxalates at 203. In this operation, oxalic acid ($C_2H_2O_4$) is added to the leached solution as a precipitating agent to precipitate out the rare earths in oxalate form and leave most of the non-rare earth impurities behind in solution. As noted above, these leaching and precipitating operations are tailored to preferentially obtain rare earths, so that subsequent operations are conducted on already relatively high purity material (e.g., at least 95%, or about 99% purity). In particular, preferentially precipitating a rare earth constituent from rare earth leachate solution as one or more rare earth oxalates can be achieved by adjusting the rare earth leachate solution to a pH preferential to the precipitation of rare earth oxalates relative to other metal oxalates, and then precipitating the rare earth constituent from the rare earth leachate solution as one or more rare earth oxalates. This can be achieved by adjusting the rare earth leachate solution to a pH of about 2, and then adding the oxalic acid to precipitate the rare earth constituent.

Again referring to FIG. 2, once the rare earth compounds are precipitated in oxalate form, the precipitate is dried and heated to a temperature in the range of 500° C.-1000° C., for example 500, 600, 650, 700 800, 900 or 1000° C. or any discrete temperature within that range, for 0.5-3 hours to convert the rare earth oxalates to mixed rare earth oxides by calcination at 204. This step enables reduced burden in terms of economics and complexity on downstream processing as well as improved purity of the individual rare earth oxides after separation.

It should also be noted that other rare earths may be present in the phosphor, and to the extent that any commercially meaningful amounts of these phosphors are present, the invention can also be applied to their recovery. For example, as noted above, the REE Gadolinium (Gd) may also be found in some phosphors, particularly those derived at least in part from compact fluorescent bulb waste. Gd may be leached from the phosphor with the other RE constituents in a single stage implementation of the invention, or with the Eu and Y components in a two-stage implementation, and precipitated and converted to oxide as described. The Gd may be further purified from the other rare earths to the desired level by ion exchange processes as would be readily understood by those of skill in the art given the disclosure provided herein.

Thus, a method for recovery of a rare earth constituent from a phosphor is disclosed. A suitable phosphor starting material is a powder, such as a phosphor powder derived from phosphor waste. The rare earth constituent can include compounds having a rare earth element selected from the group consisting of La, Ce, Eu, Tb, Y and combinations thereof. In some cases, the rare earth constituent can include Gd-containing compounds.

The method includes leaching a rare earth constituent from a phosphor to form a rare earth leachate solution; adjusting the rare earth leachate solution to a pH of about 2, and then precipitating the rare earth constituent from the rare earth leachate solution as one or more rare earth oxalates; and converting the one or more rare earth oxalates to one or more rare earth oxides. By this method, the one or more rare earth oxides can be obtained greater than 95% pure, for example about 99% pure.

The leaching may involve a single stage of leaching La, Ce, Eu, Tb and Y-comprising compounds from the phosphor by concentrated $H_2SO_4$, for example about 36N $H_2SO_4$.

Alternatively, the leaching may involve a first stage of preferentially leaching Eu and Y-comprising compounds from the phosphor by dilute $H_2SO_4$ (e.g., 6N $H_2SO_4$) to form a Eu and Y leachate, while La, Ce and Tb-comprising compounds from the phosphor are preferentially retained in an un-leached residue. Then, a second stage of preferentially leaching La, Ce and Tb-comprising compounds from the un-leached residue of first stage by concentrated $H_2SO_4$ (e.g., 36N $H_2SO_4$) to form a La, Ce and Tb leachate.

In various embodiments, the method can further include further separation and purification of individual rare earth oxides by solvent extraction or Zn reduction to achieve a high purity of greater than 99% purity, such as up to 99.9%, or up to at least 99.99%. In many cases, such a high degree of purity may be achieved without the use of ion exchange techniques, as further detailed below.

Separation of high purity Y from the high purity mixture of Eu and Y oxides can be achieved by solvent extraction with a solvent system comprising a solvent selected from the group consisting of Di-(2-ethylhexyl)phosphoric acid in dilute $H_2SO_4$/HCl/HNO$_3$, 2-ethylhexyl 2-ethylhexyl phosphonic acid in dilute $H_2SO_4$/HCl/HNO$_3$, and combinations thereof. Purification of Y oxide to greater than 99% purity, such as up to 99.9%, or up to or at least 99.99% purity can be achieved by using solvent extraction with tricaprylmethylammonium chloride.

Purification of Eu oxide to greater than 99% purity, such as up to 99.9%, or up to or at least 99.99% purity can be achieved by Zn reduction from a mixture of Eu and Y traces after separation of Y. In this regard, a custom Zn reduction apparatus is provide and may be used. The apparatus includes a column packed with zinc granules; a receptacle for collecting eluent from the column; and an inlet and an outlet on the receptacle configured for passing gaseous nitrogen through the receptacle. The apparatus is configured and operated to achieve commercial scale Zn reduction for purification of Eu oxide to 99.99%.

Separation of greater than 99% purity, such as up to 99.9%, or up to or at least 99.99% high purity Ce oxide from the mixture of oxides of La, Ce and Tb can be achieved by solvent extraction with a solvent system comprising a solvent selected from the group consisting of Di-(2-ethylhexyl)phosphoric acid, 2-ethylhexyl 2-ethylhexyl phosphonic acid, tributyl phosphate, and combinations thereof.

Separation of greater than 99% purity, such as up to 99.9%, or up to or at least 99.99% high purity La and Tb can be achieved by solvent extraction with a solvent system comprising a solvent selected from the group consisting of Di-(2-ethylhexyl) phosphoric acid, 2-ethylhexyl 2-ethylhexyl phosphonic acid, and combinations thereof, after separation of Ce.

The processes and results described herein can be practiced and achieved without caustic fusion of the phosphor or an alkaline or acidic digestion step between leaching and precipitating.

EXAMPLES

The following examples provide details of processes in accordance with two alternative embodiments of the invention—one where the leaching is performed in two stages followed by separation/purification of the individual rare earths, and a second where the leaching is performed in one stage followed by separation/purification of the individual rare earths. These examples are provided to exemplify and more clearly illustrate aspects of the present invention and are not intended to be necessarily limiting.

Example 1

Two-Stage Leaching Followed by Purification

Figure 3:
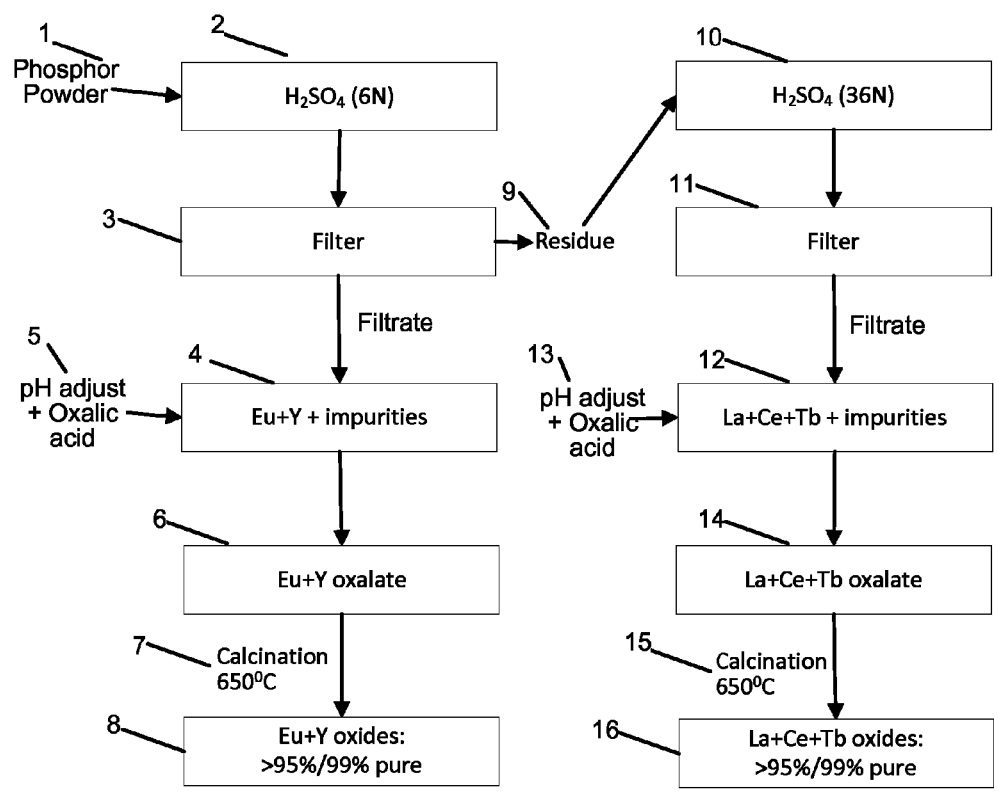
FIG. 3 is a process flow depicting the leaching of the rare earths in phosphor powder with $H_2SO_4$ in two stages.

In one embodiment of the invention, the leaching with $H_2SO_4$ was accomplished in two stages, as shown in FIG. 3 and as described below:

500 grams of phosphor powder 1 were added slowly into a glass beaker containing 3 liters of $H_2SO_4$ (6N) 2 under constant agitation with a mechanical stirrer. The rate of stirring was set to 200 revolutions per minute (rpm). This solution was heated for 4 to 6 hours, while maintaining the speed of stirring. The temperature of the solution was maintained around 90° C. After leaching for about 4 to 6 hours, the volume of the solution was increased to 5 liters with the addition of water, while continuing with the stirring. The solution thus obtained was filtered 3 using a Buchner funnel under suction. The un-leached residue was then washed thoroughly with very dilute $H_2SO_4$ to remove rare earths adsorbed in the residue. After washing the residue, the filtrate was collected and tested for La, Ce, Eu, Tb and Y. It was found that only Eu and Y 4 are preferentially leached out, while La, Ce and Tb remain in the residue. The leaching efficiency was found to be better than 95%. Leached solution, comprising of Eu, Y and other impurities 4, was further treated for the separation of Eu and Y from the solution. To achieve this goal, pH of the leached solution was adjusted to 2.0 with the help of a pH meter, and 100 g of oxalic acid 5 was then added to the leached solution. Next, the solution was slightly heated to 40° C. to precipitate out oxalates of Eu and Y 6. These oxalates were then separated using a Buchner funnel under suction. The oxalates were then washed out thoroughly using very dilute oxalic acid (0.5% solution of oxalic acid in water). The oxalates were then dried in an oven in a porcelain or silica crucible at about 100° C. for 1 hour and then calcined 7 in a furnace at about 650° C. to convert oxalates to oxides. It was found that the mixture of Eu and Y oxides 8 obtained from this calcination process was greater than 95% pure (e.g., 99% pure).

Still referring to FIG. 3, the residue 9 obtained from the filtration following the initial leaching step was treated further to leach La, Ce and Tb into solution. The residue 9 (containing some water) was added slowly into a glass beaker containing 500 ml of full-strength $H_2SO_4$ (36N) 10 under constant agitation with a mechanical stirrer. The rate of stirring was set to 100 revolutions per minute (rpm). This solution was heated for about 4-6 hours, while maintaining the speed of stirring. Temperature of the solution was maintained around 150-170° C. After leaching for about 4-6 hours and then cooling for 4-6 hours, the volume of the solution was increased to 5 liters with the addition of water, while continuing with the stirring. The solution thus obtained was filtered 11 using a Buchner funnel under suction. The un-leached residue was then washed thoroughly with very dilute $H_2SO_4$ to remove rare earths adsorbed in the residue. After washing the residue, the filtrate was collected and tested for La, Ce, and Tb. It was found that La, Ce and Tb 12 were leached out with efficiency better than 95%. Leached solution, comprising of La, Ce, Tb and other impurities 12, was further treated for the separation of La, Ce and Tb from the solution. To achieve this goal, pH of the leached solution was adjusted to 2.0 with the help of a pH meter, and 40 g of oxalic acid 13 was then added to the leached solution. Next, the solution was slightly heated to 40° C. to precipitate out oxalates of La, Ce and Tb 14. These oxalates were then separated using a Buchner funnel under suction. The oxalates in the residue were then washed out thoroughly using very dilute oxalic acid (0.5% solution of oxalic acid in water) to remove adsorbed impurities like Calcium, Barium, etc. The oxalates were then dried in an oven in a porcelain or silica crucible at 100° C. for 1 hour and then calcined 15 in a furnace at about 650° C. to convert oxalates to oxides. It was found that the mixture of La, Ce and Tb oxides 16 obtained from this calcination process was greater than 95% pure (e.g., 99% pure).

Based on the preceding, it was observed that the five rare earth elements were efficiently leached with greater 95% efficiency and purity, and also preferentially leached in two stages: $1^{st}$ stage—Eu+Y; $2^{nd}$ stage—La+Ce+Tb. Further, by oxalate precipitation at an adjusted pH of about 2, it was possible to get high purity oxides of (Eu+Y) and (La+Ce+Tb).

Next, the individual rare earths were separated from their respective mixtures and purified by the methods described below. Such methods in accordance with the present invention can be used to achieve greater than 99% purity, such as up to 99.9%, or up to or at least 99.99% purity of individual rare earth oxides. Levels of purity of individual rare earth oxides of 99.99% are described in the example description that follows. However, in these or other embodiments, the methods of the present invention may be used to provide individual rare earth oxides at suitable lower, or even higher, levels of purity, generally greater than 99% purity, such as up to 99.9%, or up to or at least 99.99%.

Figure 4:
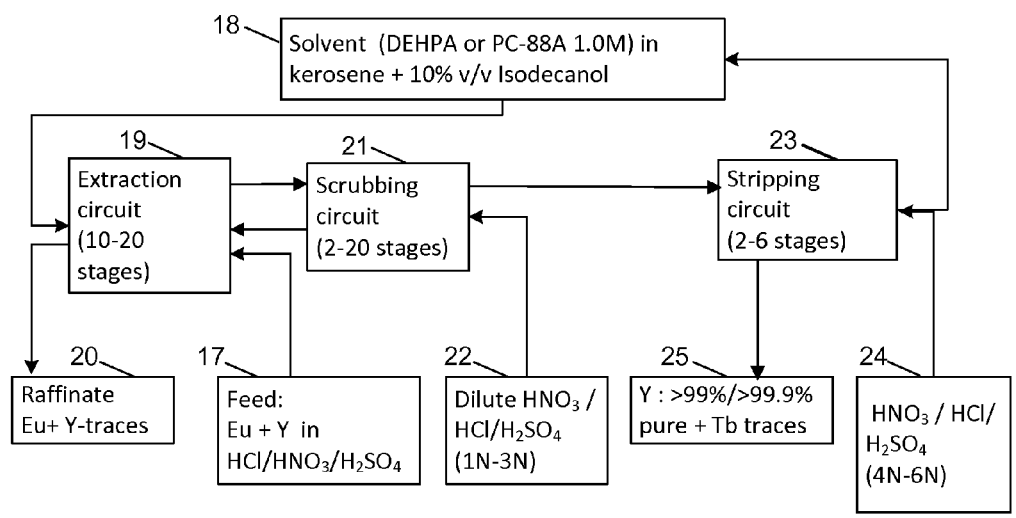
FIG. 4 is a process flow depicting the separation of Eu and Y rare earth constituents by solvent extraction.

1. Separation of Eu and Y:

Now referring to FIG. 4, a solvent extraction process using a battery of mixer-settlers was employed to achieve the separation. The high purity oxides of (Eu+Y) 8 were dissolved in acid ($HCl/HNO_3/H_2SO_4$) to form the feed solution 17. Two different 1.0M solvents 18 were tested separately—di-(2-ethyl hexyl)phosphoric acid (DEHPA) and PC-88A, which is a trade name for 2-ethylhexyl 2-ethylhexyl phosphonic acid. In both cases, kerosene was used as a diluent and 10% v/v isodecanol was added as a modifier to prevent gel formation. The battery of mixer-settlers consisted of 10-20 stages, for example 10, 15, 20 stages or other discrete numbers within the range, of extraction 19, where the Y was extracted into the organic phase and Eu remained in the aqueous phase called the raffinate 20, followed by 2-20 stages, for example 2-4, 4-6 stages or other discrete numbers within the range, of scrubbing 21, where the organic phase was scrubbed to return any Europium back to the aqueous phase, using dilute acid (1N-3N $HCl/HNO_3/H_2SO_4$) 22 and finally 2-6 stages of stripping 23, where the rare earths were stripped and the solvent was recovered, using strong acid (4N-6N $HCl/HNO_3/H_2SO_4$) 24. The stripped Y salt 25 obtained from the organic phase was about 99.9% pure, with the major impurity being Tb, which was found to be present in traces and most likely carried over from the $1^{st}$ stage of the leaching process. This salt was then reacted with oxalic acid to precipitate Y-oxalate at a pH of about 2. Subsequently the oxalate was converted to $Y_2O_3$ via a washing, drying and calcination process similar to the one described at the end of each stage of the leaching process shown in FIG. 3, to produce greater than 95%, for example 99.9% pure $Y_2O_3$.

Figure 5:
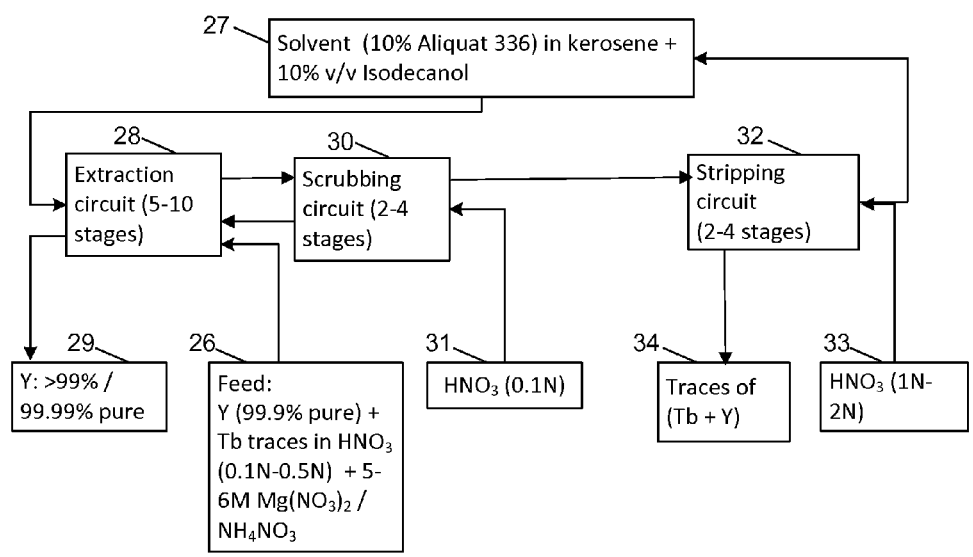
FIG. 5 is a process flow depicting purification of Y rare earth constituent to greater than 99% purity, such as up to 99.9%, or up to or at least 99.99% by solvent extraction.

2. Purification of Y to 99.99%:

As mentioned in the preceding section, the $Y_2O_3$ obtained was 99.9% pure only, due to the presence of trace amounts of Tb. Now referring to FIG. 5, a solvent extraction process using a battery of mixer-settlers was employed to achieve the purification of $Y_2O_3$ to 99.99%. The feed solution 26 was the Y+Tb traces 25 dissolved in a dilute $HNO_3$ (0.1-0.5N) medium containing 5-6M $Mg(NO_3)_2/NH_4NO_3$. The solvent 27 was 10% Aliquat 336, also known as tricaprylmethylammonium chloride, a quarternary ammonium salt, dissolved in kerosene. 10% v/v isodecanol was added as a modifier to prevent gel formation. The battery of mixer-settlers consisted of 5-10 stages of extraction 28, where the Y 29 was extracted into the aqueous phase and traces of Y and Tb go into the organic phase, followed by 2-4 stages of scrubbing 30, where the organic phase was scrubbed to return any Yttrium back to the aqueous phase, using 0.1N $HNO_3$ 31 and finally 2-4 stages of stripping 32, where the rare earths were stripped and the solvent was recovered, using 1-2N $HNO_3$ 33. The Y product 29 obtained in the raffinate was found to be 99.99% pure. This was then converted to high purity (greater than 99% purity, such as up to 99.9%, or up to or at least 99.99% pure) $Y_2O_3$ by the process described previously, comprising of conversion to oxalate followed by calcination. The stripped solution 34 containing trace amounts of Y and Tb was mixed with the feed solution 17 in the Eu+Y solvent extraction circuit described in FIG. 4.

3. Purification of Eu to 99.99%

Figure 6:
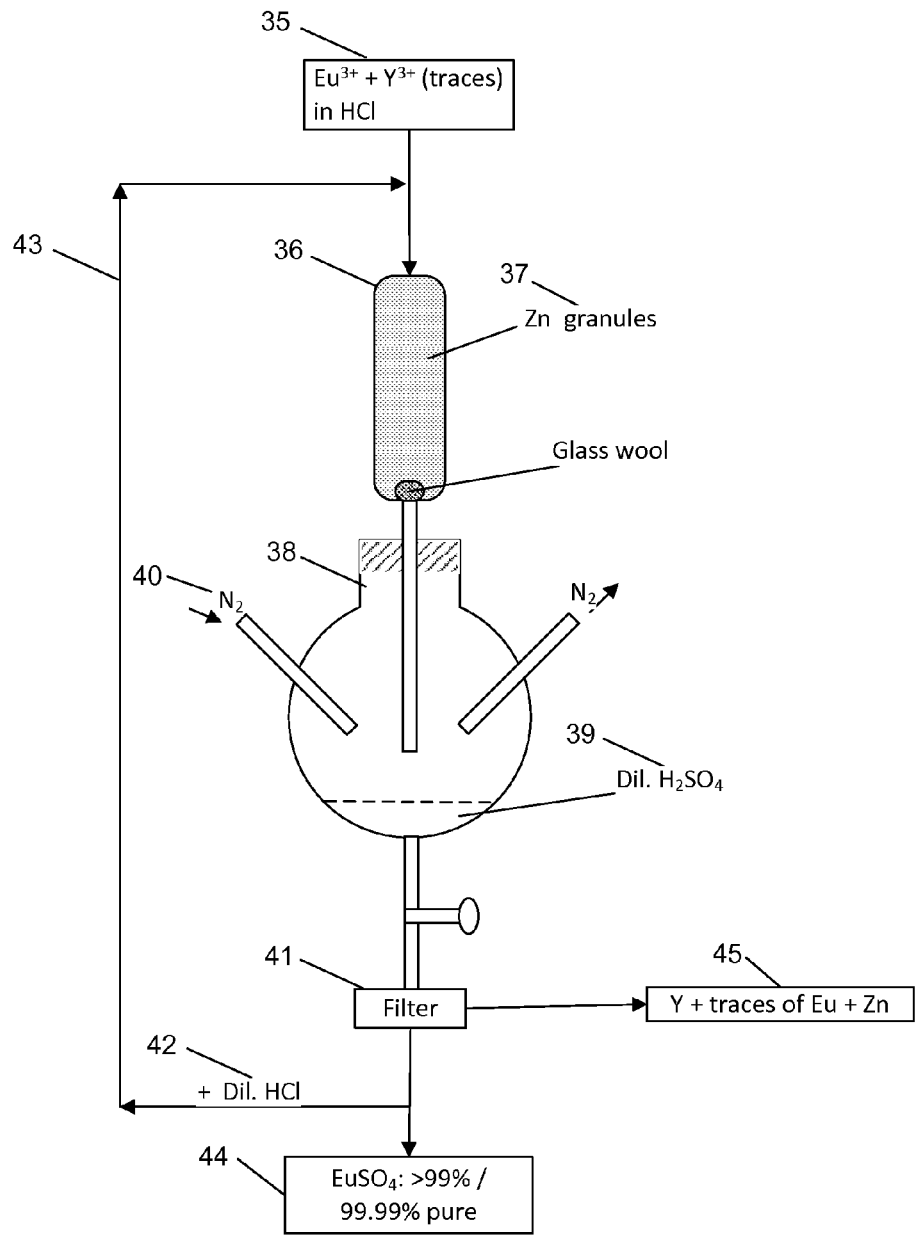
FIG. 6 is a schematic depicting purification of Eu rare earth constituent to greater than 99% purity, such as up to 99.9%, or up to or at least 99.99% by zinc reduction.

The Eu oxide 20 obtained in the raffinate in FIG. 4 was not very pure due to the relative difference in concentration between Eu and Y. Therefore, even a slight impurity of Y oxide carried over into the raffinate made the Eu oxide impure. Thus, a separate Zn reduction process, using a custom built apparatus, as depicted in FIG. 6, was used for purifying the Eu oxide obtained in the raffinate. Now referring to FIG. 6 in more detail, the feed solution 35 comprised of mixed oxides of Eu and Y dissolved in HCl. The minimum free acidity of HCl (pH about 2) was maintained to avoid hydrolysis of Eu and Y. This solution was then passed slowly through a long column 36, packed with zinc granules 37, called a Zn reductor, and the eluted solution from the reductor was collected in a flask 38 containing dilute $H_2SO_4$ 39, through which nitrogen ($N_2$) gas 40 was being passed. In the Zn reductor, the $Eu^{3+}$ was reduced to $Eu^{2+}$. When this solution was eluted and collected in dilute $H_2SO_4$, $EuSO_4$ was precipitated due to its low solubility compared to the sulfates of Y and Zn and collected as residue on a filter 41. The introduction of $N_2$ gas through $H_2SO_4$ is intended to prevent partial re-oxidation of $Eu^{2+}$ back to $Eu^{3+}$, which would result in the formation of soluble $Eu_2(SO_4)_3$.

The $EuSO_4$ collected at the end of one cycle was re-dissolved in $HNO_3$, precipitated by NaOH and this precipitate was re-dissolved in HCl (pH about 2) 42 and re-processed 43 through the top of the Zn reductor to re-precipitate as $EuSO_4$. This process was repeated several times to obtain 99.99% pure Eu. The re-precipitated $EuSO_4$ 44 was then filtered, dried and converted to $Eu_2O_3$ by dissolving in $HNO_3$, precipitating as oxalate and calcination above 700° C. $Eu_2O_3$ thus obtained was found to be of high purity (99.99%) and recovery was high (about 95%) as well. The filtrate 45 containing $Y_2(SO_4)_3$, traces of $Eu_2(SO_4)_3$ and $ZnSO_4$ ($Zn^{2+}$ ions were liberated due to the oxidation of Zn simultaneously with the reduction of $Eu^{3+}$ to $Eu^{2+}$) was processed further for the recovery of Y and traces of Eu by precipitating these as oxalates and converting to oxides by calcinations. This mixed oxide was then dissolved in acid and mixed with the feed solution 17 in the Eu+Y solvent extraction circuit described in FIG. 4. After recovery of Eu and Y, Zn from the filtrate was recovered by precipitating as $ZnCO_3$ at a suitable pH and then filtering, drying and calcining it to convert to a ZnO by-product.

4. Separation of Ce from La and Tb

Figure 7:
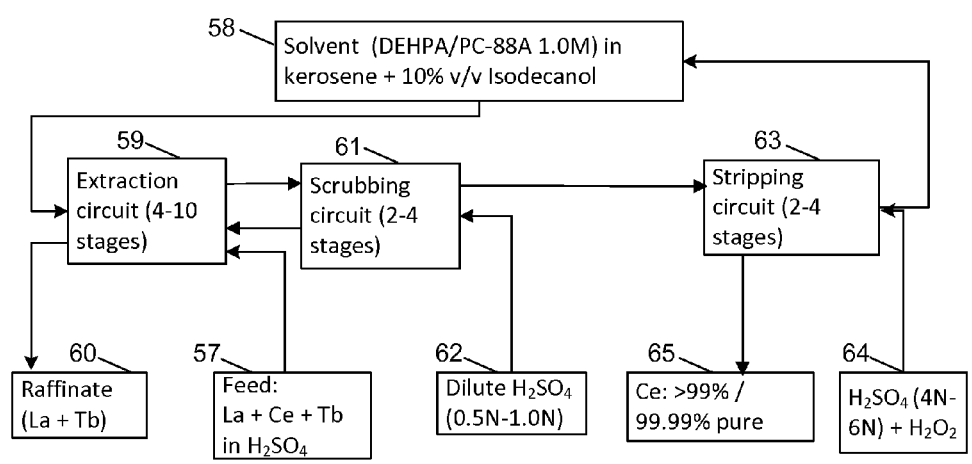
FIG. 7 is a process flow depicting separation of Ce from La and Tb rare earth constituents by solvent extraction using Di-(2-ethylhexyl)phosphoric acid (DEHPA)/2-Ethylhexyl 2-ethylhexylphosphonic acid (PC-88A).

As shown in FIG. 7, a solvent extraction process using a battery of mixer-settlers was employed to achieve the separation of Ce from the mixture. The high purity oxides of (La+Ce(IV)+Tb) 16 (from FIG. 3) were dissolved in 1N to 2.5N $H_2SO_4$ to form the feed solution 57. The solvent 58 was 1.0M DEHPA/PC-88A dissolved in kerosene or Shellsol T, sometimes with dodecane and with 10% isodecanol added as a modifier. The battery of mixer-settlers included of 4-10 stages of extraction 59, where the Ce was extracted into the organic phase and La+Tb 60 remains in the aqueous phase, followed by 2-4 stages of scrubbing 61, where the organic phase was scrubbed to return any La+Tb back to the aqueous phase, using dilute acid (0.5N-1.0N $H_2SO_4$) 62 and finally 2-4 stages of stripping 63, where the rare earths were stripped using concentrated acid (4N-6N $H_2SO_4$) along with $H_2O_2$ 64 to reduce $Ce^{4+}$ to $Ce^{3+}$, and the solvent was recovered. The stripped $Ce_2(SO_4)_3$ 65 obtained from the organic phase was 99.99% pure. This salt was then reacted with oxalic acid to precipitate Ce-oxalate at a pH of about 2. Subsequently the oxalate was converted to $CeO_2$ via a washing, drying and calcination process similar to the one described at the end of each stage of the leaching process shown in FIG. 3, to produce 99.99% pure $CeO_2$.

Figure 8:
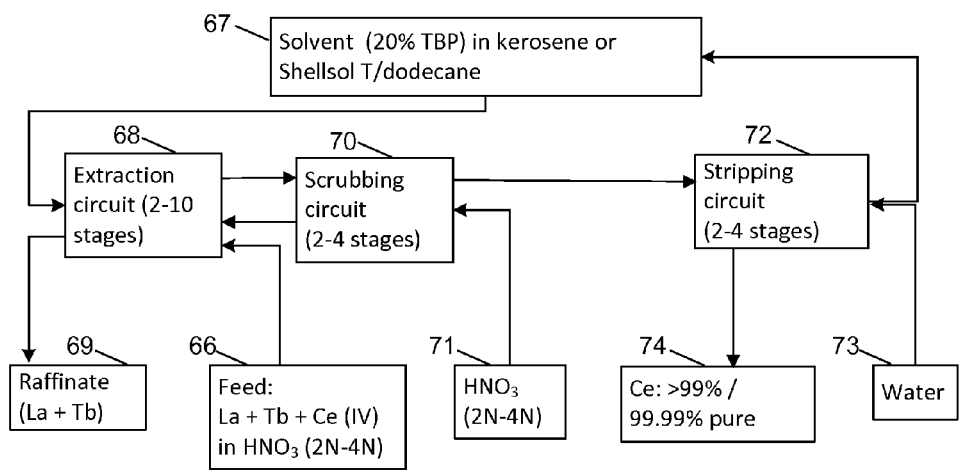
FIG. 8 is a process flow depicting separation of Ce from La and Tb rare earth constituents by solvent extraction using Tributyl phosphate (TBP).

In another embodiment of the invention, as shown in FIG. 8, a solvent extraction process using a battery of mixer-settlers was employed to achieve the separation of Ce from the mixture. The high purity oxides of (La+Ce+Tb) 16 were dissolved in 2N-4N $HNO_3$ to form the feed solution 66. The solvent 67 was 20% tri-n-butyl phosphate (TBP) diluted with kerosene or Shellsol T, sometimes with dodecane. The battery of mixer-settlers consisted of 2-10, for example 2, 3, 4, 5, 6, 7, 8, 9 or 10, stages of extraction 68, where the Ce was extracted into the organic phase and La+Tb 69 remains in the aqueous phase, followed by 2-4 stages of scrubbing 70, where the organic phase was scrubbed to return any La+Tb back to the aqueous phase, using 2N-4N $HNO_3$ 71 and finally 2-4 stages of stripping 72, where the rare earths were stripped and the solvent was recovered, using water 73. The stripped $Ce(NO_3)_4$ 74 obtained from the organic phase was 99.99% pure. This salt was then reacted with oxalic acid to precipitate Ce-oxalate at a pH of about 2. Subsequently the oxalate was converted to $CeO_2$ via a washing, drying and calcination process similar to the one described at the end of each stage of the leaching process shown in FIG. 1, to produce 99.99% pure $CeO_2$.

5. Separation of La and Tb

Figure 9:
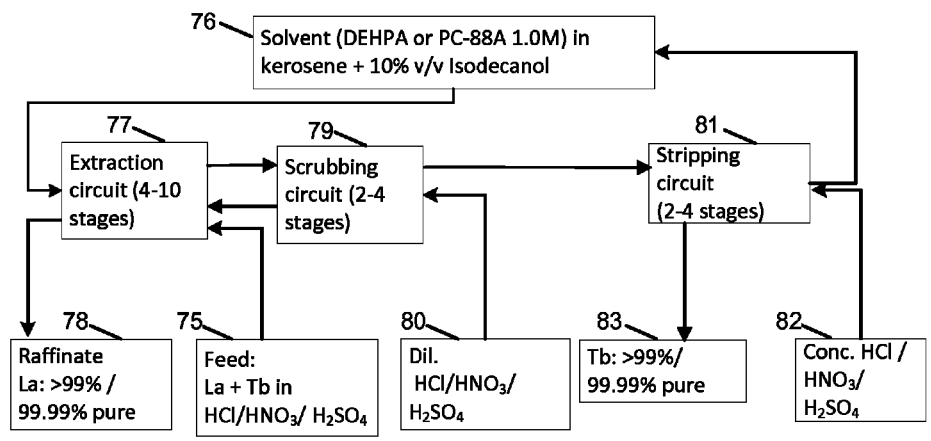
FIG. 9 is a process flow depicting separation of La and Tb rare earth constituents by solvent extraction using either Di-(2-ethylhexyl)phosphoric acid (DEHPA) or 2-Ethylhexyl 2-ethylhexyl phosphonic acid (PC-88A).

Now referring to FIG. 9, a solvent extraction process using a battery of mixer-settlers was employed to achieve the separation. The La+Tb mixture 60 and/or 69 left behind after the separation of Ce, described in the preceding section, was dissolved in 1N acid (HCl/$HNO_3$/$H_2SO_4$) to form the feed solution 75. Two different 1.0M solvents 76 were tested separately—DEHPA and PC-88A; these were dissolved in kerosene and 10% v/v isodecanol was added as a modifier to prevent gel formation. The battery of mixer-settlers consisted of 4-10 stages of extraction 77, where the Tb was extracted into the organic phase and La remained in the aqueous phase 78, followed by 2-4 stages of scrubbing 79, where the organic phase was scrubbed to return any La back to the aqueous phase, using dilute HCl/$HNO_3$/$H_2SO_4$ (1N for DEHPA and 0.1N-0.5N for PC-88A) 80 and finally 2-4 stages of stripping 81, where the rare earths were stripped and the solvent was recovered, using concentrated HCl/$HNO_3$/$H_2SO_4$ (4N-6N) 82. The stripped Tb salt 83 obtained from the organic phase was 99.99% pure, as was the La salt 78 remaining in the aqueous phase. These salts were then individually reacted with oxalic acid to precipitate Tb and La oxalates, respectively, at a pH of about 2. Subsequently these oxalates were converted to $Tb_4O_7$ and $La_2O_3$, respectively, via a washing, drying and calcination process similar to the one described at the end of each stage of the leaching process shown in FIG. 3, and were found to be 99.99% pure.

The preceding describes how the individual rare earths present in the non-hazardous waste phosphor powder were leached in two stages and converted into two separate groups of high purity rare earth oxide mixtures. The different processes employed for the separation/purification of the individual rare earth oxides to greater than 99% purity, such as up to 99.9%, or up to or at least 99.99% pure oxides were also described in detail.

Example 2

Single-Stage Leaching Followed by Purification

Figure 10:
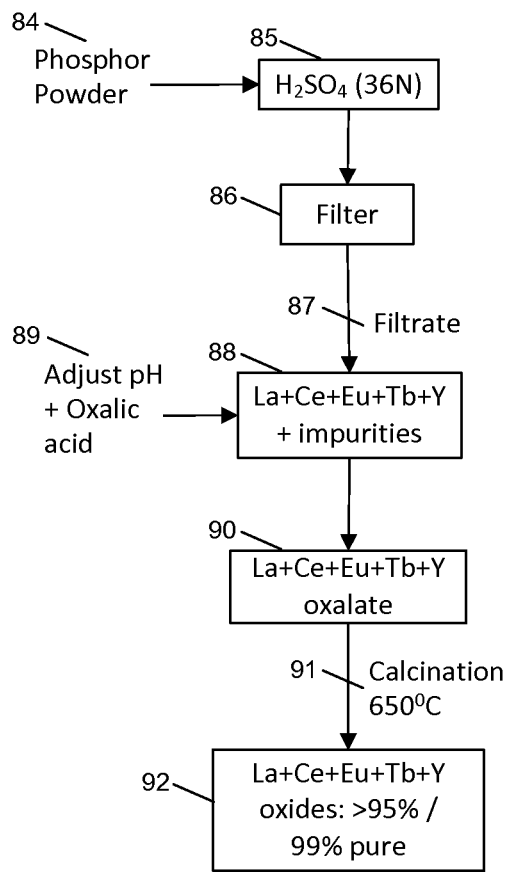
FIG. 10 is a process flow depicting the leaching of the rare earths in phosphor powder with $H_2SO_4$ in one stage.

In another embodiment of the invention, the leaching with $H_2SO_4$ was accomplished in one stage, as shown in FIG. 10 and as described below:

500 grams of phosphor powder 84 were added slowly into a glass beaker containing 500 ml of concentrated $H_2SO_4$ (about 36N) 85 under constant agitation with a mechanical stirrer. The rate of stirring was set to 120 revolutions per minute (rpm). This solution was heated for 6 hours, while maintaining the speed of stirring. Temperature of the solution was maintained around 150-170° C. After leaching for 6 hours and cooling for 3-4 hours, the volume of the solution was increased to 5 liters by adding this solution to water slowly, while continuing with the stirring. The solution thus obtained was filtered 86 using a Buchner funnel under suction. The un-leached residue was then washed thoroughly with very dilute $H_2SO_4$ to remove rare earths adsorbed in the residue. After washing the residue, the filtrate 87 was collected and tested for La, Ce, Eu, Tb and Y. It was observed that under these conditions, all the rare earths—La, Ce, Eu, Tb and Y 88 were leached to the extent of about 95%. Leached solution was further treated for the separation of mixed rare earths (La+Ce+Eu+Tb+Y) 88 from the other impurities in the solution. To achieve this goal, pH of the leached solution was adjusted to 2.0 with the help of a pH meter, and 120 g of oxalic acid 89 was then added to the leached solution. Next, the solution was slightly heated to 40° C. to precipitate out oxalates 90 of all the five rare earths. These oxalates 90 were then separated using a Buchner funnel under suction. The oxalates in the residue were then washed out thoroughly using very dilute oxalic acid (0.5% solution of oxalic acid in water) to remove adsorbed impurities like, Ca, Ba, Sr, etc. The oxalates were then dried in an oven in a porcelain or silica crucible at 100° C. for 2 hours and then calcined 91 in a furnace at about 650° C. to convert oxalates to oxides. It was found that the mixture of La, Ce, Eu, Tb and Y oxides 92 obtained from this calcination process was greater than 95% pure, e.g., about 99% pure.

Methods for separating the individual rare earths from a mixture of five rare earth oxides (La, Ce, Eu, Tb and Y) in accordance with this aspect of the present invention are now described with reference to FIGS. 11-14.

Figure 11:
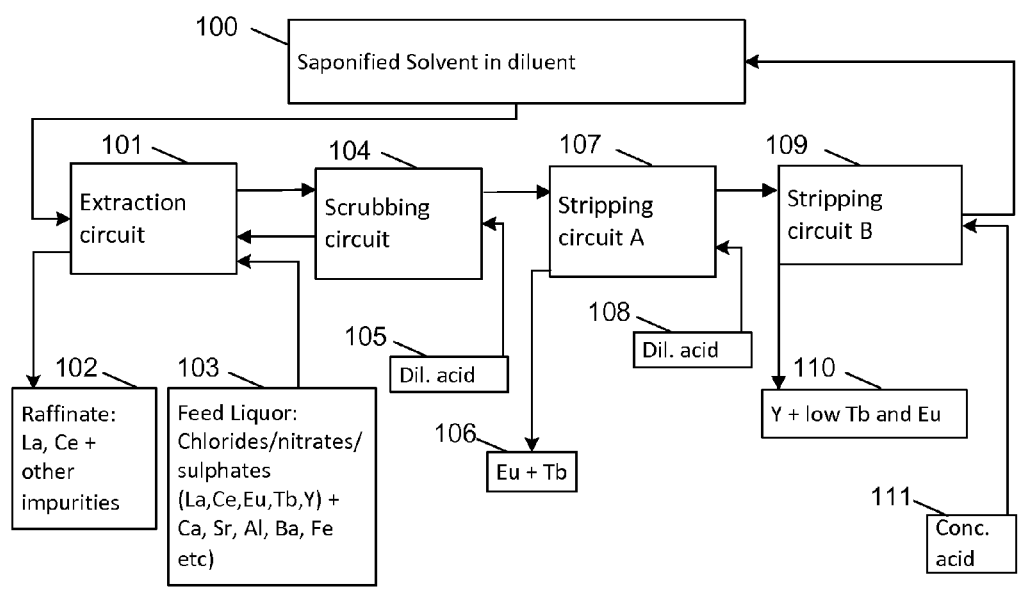
FIG. 11 is a process flow depicting the fractionation of rare earths leached as described with reference to FIG. 10.

Referring to FIG. 11, the mixed rare earth oxides 92 are dissolved in hydrochloric acid (HCl), nitric acid ($HNO_3$) or sulfuric acid ($H_2SO_4$) to obtain chlorides/nitrates/sulfates and are ready to be separated into individual rare earth oxides. Several separation processes can be used for this purpose such as, but not limited to, solvent extraction, ion exchange, precipitation and reduction-precipitation. These processes may be used in isolation for extracting specific rare earth compounds, or in combination to achieve optimal separation, with high purity and extraction efficiency.

One embodiment of the separation process in this aspect of the invention is shown in FIG. 11, which depicts a solvent extraction process for fractionation of rare earth constituents. First, an appropriate solvent that offers high separation factors for the rare earth elements that are being separated is selected. Referring to FIG. 3, a saponified solvent in a diluent 100 is used to affect separation between the various rare earths. Solvent choices could be liquid cation exchangers, anion exchangers or even neutral exchangers. In one embodiment of the invention, combinations of different solvent types may be used in order to achieve desired purity (ultimately, greater than 99% purity, such as up to 99.9%, or up to or at least 99.99%) of specific rare earth constituents. During the course of metal extraction, acid is liberated and this impacts the equilibrium acidity, which in turn impacts the extraction of metals. Saponification is carried out to keep acidity almost constant in a counter-current extraction process, thereby ensuring a high degree of extraction and a compact plant size. Further, suitable modifiers, as noted above, may need to be added to the solvent in order to prevent gel formation.

From the point of view of enhancing or maximizing the extraction of rare earths, another parameter to control is the time taken by the reaction to reach equilibrium, also referred to as the equilibrium time. This parameter determines the size of the plant; shorter equilibrium time translates into greater production capability for a given plant size. In this example, the equilibrium times for the processes ranged from about 1-10, for example 1, 2, 3, 4, 5, 6, 7, 8, 9, or 10 minutes or any discrete period of time within that range.

In further detail, still referring to FIG. 11, there is an Extraction Circuit 101, having several stages, wherein the feed liquor 103 containing the rare earth chlorides/nitrates/sulfates and other materials are fed into a mixer-settler, where Eu, Tb and Y are extracted into the organic phase and move on to the next phase, the scrubbing circuit 104, while Ce, La and other impurities go to the raffinate 102. The number of extraction stages is determined to be 4-10 to enhance or maximize efficiency (e.g., to greater than 99% extraction).

Continuing to refer to FIG. 11, scrubbing circuit 104 has several stages where dilute acid 105 is added to the organic phase carried over from the extraction circuit 101 to remove partially extracted La and Ce back to the raffinate 102. A typical number of stages in the scrubbing circuit 104 is 10-20 to increase or maximize impurity removal and to achieve 99.99% purity of the desired rare earth elements. The concentration of the dilute acid 105 should be carefully controlled so as not to bring any or all of Eu, Tb and Y back into the raffinate, which could complicate the separation process further. An example of dilute acid 105 that can be used is HCl with a concentration in the range of 0.1N-0.7N. Other acids and/or concentrations may be used as appropriate.

Still referring to FIG. 11, in a stripping circuit A 107 having several stages, dilute acid 108 is added to the scrubbed organic phase flowing in from the scrubbing circuit 104, in order to remove Eu and Tb from the organic phase to the aqueous phase 106. Y remains in the organic phase along with a small amount of Eu and Tb and is passed on to the next stage, final stripping circuit B 109. A typical number of stages in the stripping circuit A 107 is 2-6. An example of dilute acid 108 that can be used is HCl. Other acids and/or concentrations may be used as appropriate.

Continuing to refer to FIG. 11, final stripping circuit B 109 has several stages where concentrated acid 111 is added to the stripped organic phase flowing in from stripping circuit A 107 to remove Y 110 at 99% purity into the aqueous phase. The impurities entrained with Y 110 are Eu and/or Tb in small quantities. The typical number of stages in the stripping circuit B 109 is 4-12. An example of concentrated acid 111 that can be used is HCl with a concentration in the range of 4N-10N. Other acids and/or concentrations may be used as appropriate. Once all the rare earths have been removed, the organic solvent is re-circulated back in the system after saponification 100.

In the extraction circuit 101, scrubbing circuit 104 and stripping circuits 107, 109, the organic to aqueous volume ratio (O/A) can be determined to get enhanced or optimum efficiency in the process. Ultimately, these parameters determine the flow rates of the feed liquor 103 used in the extraction circuit 101, dilute acid 105 used for the scrubbing circuit 104 and the dilute acid 108 and concentrated acid 111 used for the stripping circuits 107, 109. Typical numbers for this ratio in the extraction circuit 101 range from 1:5 to 2:1; typical numbers in the scrubbing circuit 104 and stripping circuits 107, 109 range from 3:1 to 5:1.

Figure 12:
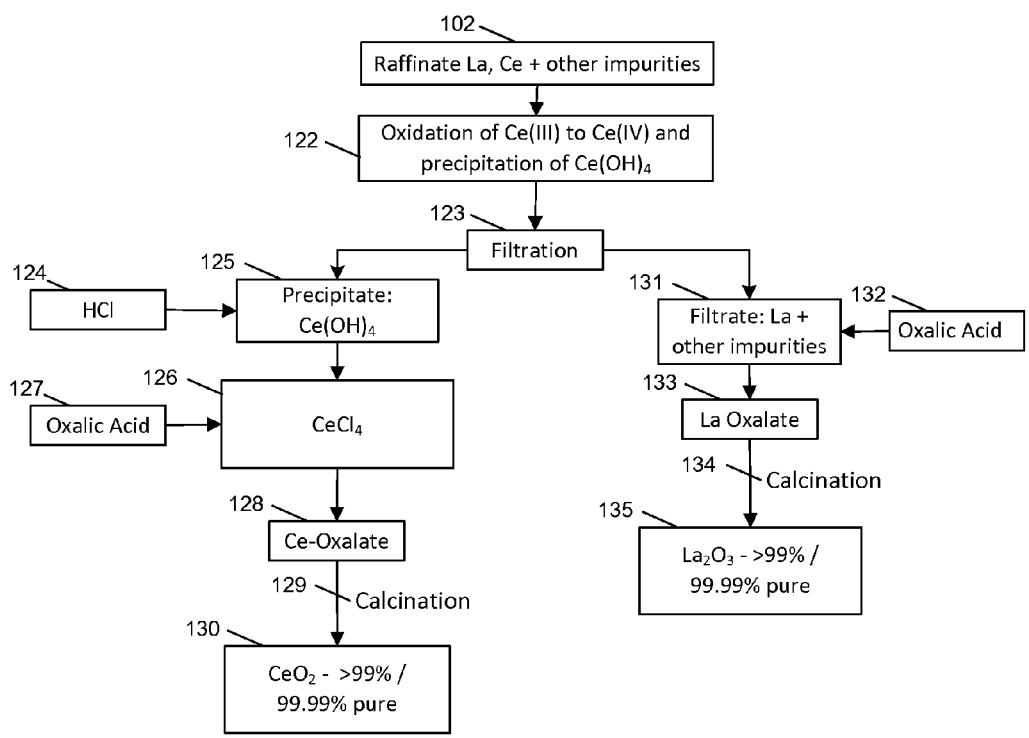
FIG. 12 is a process flow depicting the purification of Lanthanum and Cerium oxides.

Now, referring to FIG. 12 in more detail, the raffinate 102 consisting of La, Ce and other impurities from FIG. 11, is next subjected to a process for purification of Lanthanum and Cerium oxides.

Initially, Ce(III) is oxidized to Ce(IV) 122 using a suitable oxidizing agent and subsequently precipitated as $Ce(OH)_4$ with a pH adjusted in the range of about 3-3.5. $Ce(OH)_4$ 125 is then separated out using a filtration 123 process. It is then washed with dilute $NH_4OH$ and dissolved in HCl 124, resulting in the formation of $CeCl_3$ 126. This compound is then converted to insoluble Ce-oxalate 128 using oxalic acid 127. Ce-oxalate 128 is then filtered, washed with dilute oxalic acid, dried and calcined 129 at a temperature in the range of about 500° C.-1000° C., for example 500, 600, 650, 700 800, 900 or 1000° C. or any discrete temperature within that range to obtain high purity (greater than 99% purity, such as up to 99.9%, or up to or at least 99.99%) $CeO_2$ 130. If a single pass does not yield the desired purity, then the $CeO_2$ can be re-dissolved in HCl, re-precipitated as oxalate and converted to $CeO_2$ as many times as necessary to yield the required purity.

Still referring to FIG. 12, the filtrate 131 obtained after separation of $Ce(OH)_4$ contains La along with some minor impurities such as Ca, Sr, Ba, etc. This filtrate 131 is treated with oxalic acid 132 to precipitate La-oxalate 133 with a pH adjusted in the range of about 3-3.5. La-oxalate is filtered out, washed with dilute oxalic acid, dried and calcined 134 at temperature in the range of about 500° C.-1000° C., for example 500, 600, 650, 700 800, 900 or 1000° C. or any discrete temperature within that range to obtain high purity (greater than 99% purity, such as up to 99.9%, or up to or at least 99.99%) $La_2O_3$ 135. If a single pass does not yield the desired purity, then the $La_2O_3$ can be re-dissolved in HCl, re-precipitated as oxalate and converted to $La_2O_3$ as many times as necessary to yield the required purity.

In another embodiment of this aspect of the invention, a process of purification of Lanthanum and Cerium oxides may be achieved by a process similar to that described with reference to FIG. 11 for the fractionation of rare earths, wherein a suitable saponified solvent (e.g., cation exchanger) is used in a sequence of extraction, scrubbing and stripping circuits to effectively separate La and Ce constituents and have sufficient stages to achieve the desired high purity (greater than 99% purity, such as up to 99.9%, or up to or at least 99.99%) of these constituents.

Figure 13:
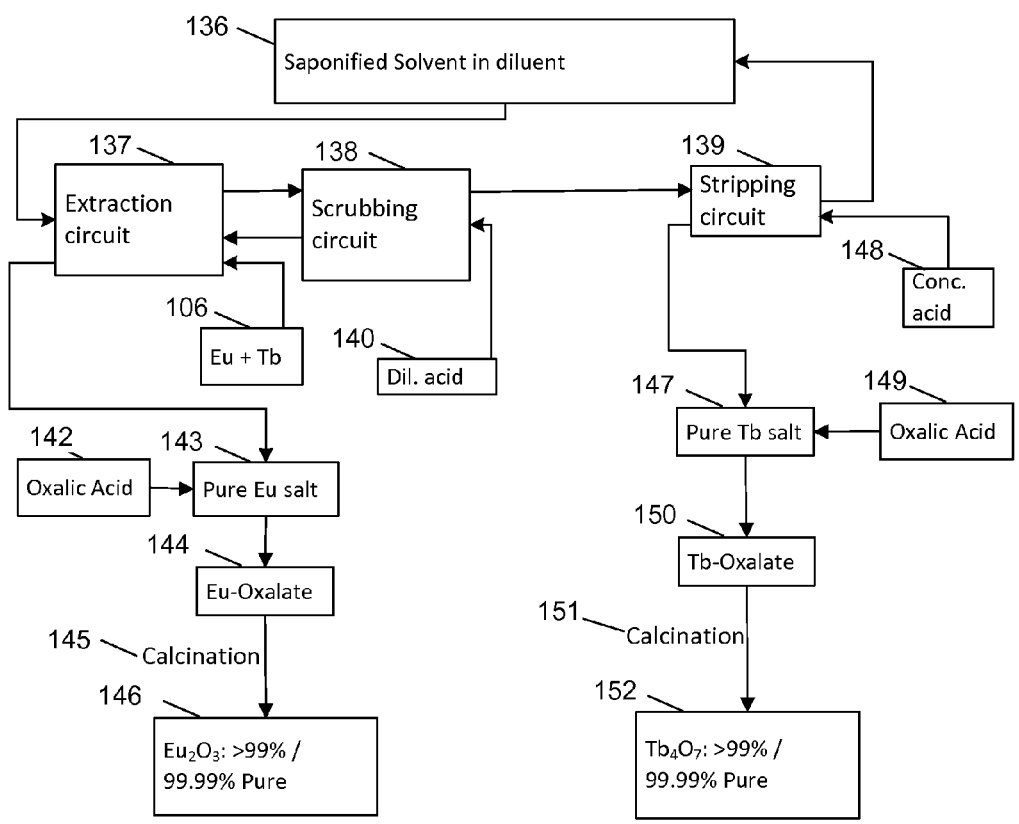
FIG. 13 is a process flow depicting purification of Europium and Terbium oxides.

Referring now to FIG. 13 in more detail, the Eu and Tb 106, obtained as a stripped solution from stripping circuit A in the process described with reference to FIG. 11 for the fractionation of rare earths, is next subjected to a process for purification of Europium and Terbium oxides.

A saponified solvent, for example a liquid cation exchanger, in suitable diluent 136, which offers effective separation of Eu and Tb, is selected. Extraction circuit 137, has several stages, wherein the Eu and Tb solution feed liquor 106 is fed along with the solvent 136 into a mixer-settler, where Tb is extracted into the organic phase and moves on to the next phase, scrubbing circuit 138, while a pure Eu salt 143 goes to the raffinate. A typical number of stages in the extraction circuit is 4-6. The Eu salt 143 is then converted to an oxalate 144, using oxalic acid 142 with a pH adjusted to about 2. This Eu-oxalate 144 is then filtered, washed with dilute oxalic acid, dried and calcined 145 at a temperature in the range of about 500° C.-1000° C., for example 500, 600, 650, 700 800, 900 or 1000° C. or any discrete temperature within that range, to obtain high purity (greater than 99% purity, such as up to 99.9%, or up to or at least 99.99%) $Eu_2O_3$ 146.

Still referring to FIG. 13, scrubbing circuit 138 has several stages where dilute acid 140 is added to the organic phase carried over from the extraction circuit 137 to remove partially extracted Eu back to the raffinate 143. A typical number of stages in the scrubbing circuit 138 is 5-15 to enhance or maximize impurity removal. The concentration of the dilute acid 140 should be carefully controlled at about 0.1N so as not to bring any Tb back into the raffinate, which could complicate the separation process further. An example of dilute acid 140 that can be used is HCl. Other acids and/or concentrations may be used as appropriate.

Continuing to refer to FIG. 13, stripping Circuit 139 has several stages where concentrated acid 148 is added to the scrubbed organic phase flowing in from the scrubbing circuit 138, in order to remove Tb from the organic phase to the aqueous phase as pure Tb salt 147. A typical number of stages in the stripping circuit 139 is 2-6. An example of concentrated acid 148 that can be used is HCl with a concentration in the range of 4N-10N. Other acids and/or concentrations may be used as appropriate. Once the Tb salt 147 has been removed, the organic solvent is re-circulated back in the system after saponification 136. The Tb salt 147 is then converted to an oxalate 150, using oxalic acid 149 with a pH adjusted to about 2. This Tb-oxalate 150 is then filtered, washed with dilute oxalic acid, dried and calcined 151 at temperature in the range of about 500° C.-1000° C., for example 500, 600, 650, 700 800, 900 or 1000° C. or any discrete temperature within that range to obtain high purity (greater than 99% purity, such as up to 99.9%, or up to or at least 99.99%) $Tb_4O_7$ 152.

Figure 14:
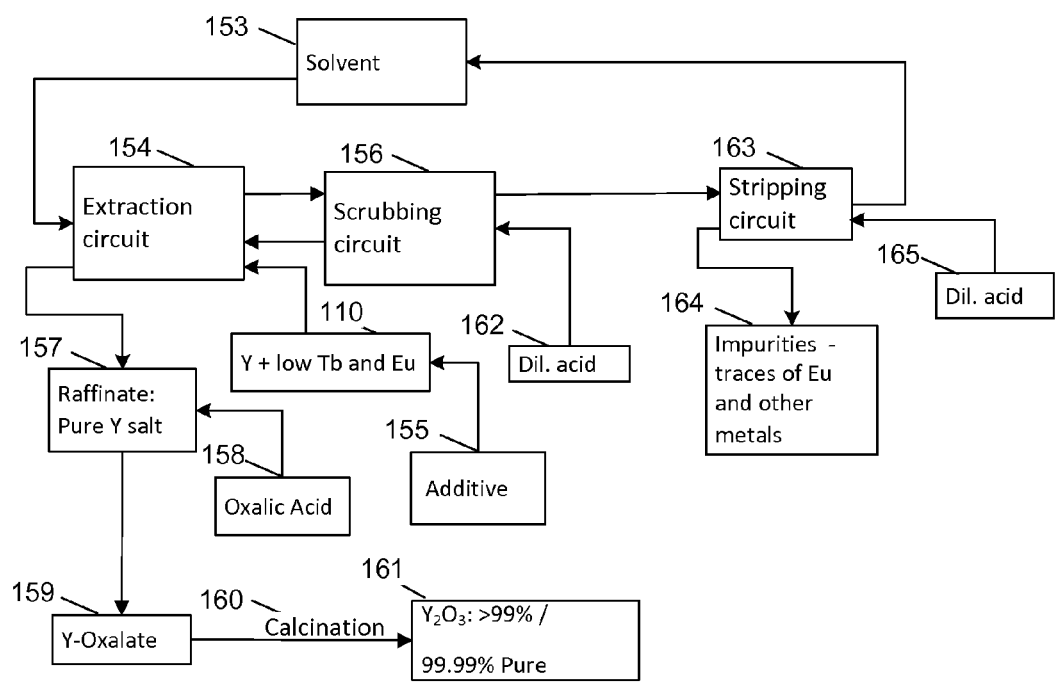
FIG. 14 is a process flow depicting purification of Yttrium oxide.

Referring now to FIG. 14 in more detail, the Y+low Tb and Eu 110 obtained as a stripped solution from stripping circuit B in the fractionation of rare earths process described with reference to FIG. 11, is next subjected to a process for purification of Yttrium oxide.

A suitable solvent 153, for example a liquid anion exchanger, which offers effective extraction of impurities from Y, is selected. The Y+low Tb and Eu solution feed liquor 110 is fed into an extraction circuit 154 having several stages along with an additive 155, for example $NH_4NO_3$, and the solvent 153. The extraction circuit 154 includes a mixer-settler where trace amounts of Tb and Eu are extracted into an organic phase and moved on to the next phase, scrubbing circuit 156, while a pure Y 157 salt goes to the raffinate. A typical number of stages in the extraction circuit are 4-6. The Y salt 157 is then converted to an oxalate 159, using oxalic acid 158 with a pH adjusted to about 2. This Eu-oxalate 159 is then filtered, washed with dilute oxalic acid, dried and calcined 160 at temperature in the range of about 500° C.-1000° C., for example 500, 600, 650, 700 800, 900 or 1000° C. or any discrete temperature within that range, to obtain high purity (greater than 99% purity, such as up to 99.9%, or up to or at least 99.99%) $Y_2O_3$ 161.

Still referring to FIG. 14, scrubbing circuit 156 includes several stages where dilute acid 162 is added to the organic phase carried over from the extraction circuit 154 to remove partially extracted Y back to the raffinate 157. A typical number of stages in the scrubbing circuit 156 to enhance or optimize impurity removal is 20-25. The concentration of the dilute acid 162 should be carefully controlled so as not to bring any Eu and Tb back into the raffinate, which could complicate the separation process further. An example of dilute acid 162 that can be used is $HNO_3$, with a concentration in the range of 0.2N-0.5N.

Continuing to refer to FIG. 14, stripping circuit 163 includes several stages, where dilute acid 165 is added to the scrubbed organic phase flowing in from the scrubbing circuit 156 in order to remove the trace amounts of Eu, Tb and other metal impurities from the organic phase to the aqueous phase 164. A typical number of stages in the stripping circuit 163 is 2-6. An example of dilute acid 165 that can be used is $HNO_3$ with a concentration in the range of 2N-5N. Once the metal impurities 164 have been removed, the organic solvent is re-circulated back in the system 153.

Waste Handling

The major bulk of the waste produced by processes in accordance with the present invention is solid waste that is non-hazardous and may either be sent to a landfill or used in other industrial applications. In one embodiment, it is possible to recover and re-use the non-rare earth phosphors from the waste phosphor powder, once all the glass dust and other non-phosphor impurities have been separated out.

In reference to acid consumption of any one or combinations of $H_2SO_4$, HCl and $HNO_3$, the vast majority (greater than 90%) is generally consumed in the conversion of the various metals in the waste phosphor powder into sulfates, chlorides or nitrates, as applicable. Some acids go into the vapor phase and are managed through the use of scrubbers in the exhaust system.

When rare earths are precipitated and filtered as hydroxides using $NH_4OH$, as shown in FIG. 12, soluble ammonium salts of the acids are formed and remain in the filtrate. The solution containing these salts is alkaline due to addition of excess ammonia to precipitate the rare earths. This alkaline solution is made acidic by the addition of $H_2SO_4$. Subsequently, this acidic solution can be made alkaline by adding $Ca(OH)_2$ or $CaCO_3$. This results in the formation of insoluble $CaSO_4$ and smaller amounts of $CaCl_2$ or $Ca(NO_3)_2$, which can be discarded as solid wastes.

When rare earths are precipitated and filtered as oxalates using oxalic acid and $NH_4OH$, soluble ammonium salts are formed that remain in the filtrate. In the case of chloride or nitrate formation, a slight amount of $H_2SO_4$ is added to the filtrate. Subsequent treatment and waste generation is similar to the description in the preceding paragraph, following the addition of $H_2SO_4$.

The filtrate described in the previous two paragraphs may contain calcium salts and a small amount of oxalic acid mostly in solution. Water can be recovered from this solution through distillation and reused in leaching. The residue remaining behind after distillation is a solid waste that is non-hazardous.

The various solvents used in processes in accordance with the invention are mostly reused as shown in the figures. Due to low solubility in aqueous phase, the losses are minimal, so the waste disposal material is practically free of solvents.

CONCLUSION

Methods and systems for recovering rare earths from phosphors, such as electronic waste sources containing the same, are provided.

Although the foregoing invention has been described in some detail for purposes of clarity of understanding, it will be apparent that certain changes and modifications may be practiced within the scope of the invention. It should be noted that there are many alternative ways of implementing both the process and compositions of the present invention. Accordingly, the present embodiments are to be considered as illustrative and not restrictive, and the invention is not to be limited to the details given herein.

What is claimed is:

1. A method for recovery of a rare earth constituent from a phosphor, the method comprising:
   leaching a rare earth constituent from a phosphor with $H_2SO_4$ to form a rare earth leachate solution;
   adjusting the rare earth leachate solution to a pH preferential to the precipitation of rare earth oxalates relative to other metal oxalates, and then precipitating the rare earth constituent from the rare earth leachate solution as one or more rare earth oxalates; and
   converting the one or more rare earth oxalates to one or more rare earth oxides.

2. The method of claim 1, wherein the one or more rare earth oxides is greater than 99% pure.

3. The method of claim 1, wherein the phosphor is a powder derived from phosphor waste.

4. The method of claim 1, wherein the pH of the rare earth leachate solution is adjusted to about 2.

5. The method of claim 1, wherein the rare earth constituent comprises compounds comprising a rare earth element selected from the group consisting of La, Ce, Eu, Tb, Y and combinations thereof.

6. A method for recovery of a rare earth constituent from a phosphor, the method comprising:
   leaching a rare earth constituent from a phosphor to form a rare earth leachate solution;
   adjusting the rare earth leachate solution to a pH preferential to the precipitation of rare earth oxalates relative to other metal oxalates, and then precipitating the rare earth constituent from the rare earth leachate solution as one or more rare earth oxalates; and
   converting the one or more rare earth oxalates to one or more rare earth oxides;
   wherein the rare earth constituent comprises compounds comprising a rare earth element selected from the group consisting of La, Ce, Eu, Tb, Y and combinations thereof; and
   wherein the leaching comprises a first stage of leaching Eu and Y-comprising compounds from the phosphor with about 6N $H_2SO_4$ to form a Eu and Y leachate, while La, Ce and Tb-comprising compounds from the phosphor are retained in an un-leached residue.

7. The method of claim 6, further comprising a second stage of leaching La, Ce and Tb-comprising compounds from the un-leached residue by an about 36N $H_2SO_4$ to form a La, Ce and Tb leachate.

8. The method of claim 7, wherein the first stage Eu and Y leachate and second stage La, Ce and Tb leachate are further separately processed following the leaching resulting in a high purity mixture of Eu and Y oxides and a separate high purity mixture of La, Ce and Tb oxides.

9. The method of claim 8, wherein the purity of the oxides is greater than 95%.

10. The method of claim 9, wherein the purity of the oxides is at least 99%.

11. The method of claim 6, further comprising separation and purification of individual rare earth oxides by solvent extraction or Zn reduction to achieve a high purity of greater than 99%.

12. The method of claim 8, further comprising separation of high purity Y from the high purity mixture of Eu and Y oxides by solvent extraction with a solvent system comprising a solvent selected from the group consisting of Di-(2-ethylhexyl)phosphoric acid in dilute $H_2SO_4$/HCl/$HNO_3$, 2-ethylhexyl 2-ethylhexyl phosphonic acid in dilute $H_2SO_4$/HCl/$HNO_3$, and combinations thereof.

13. The method of claim 12, further comprising purification of Y oxide to greater than 99% purity using solvent extraction with tricaprylmethylammonium chloride.

14. The method of claim 12, further comprising purification of Eu oxide to greater than 99% purity by Zn reduction from a mixture of Eu and Y traces after separation of Y.

15. The method of claim 12, further comprising separation of greater than 99% high purity Ce oxide from the mixture of oxides of La, Ce and Tb by solvent extraction with a solvent system comprising a solvent selected from the group consisting of Di-(2-ethylhexyl)phosphoric acid, 2-ethylhexyl 2-ethylhexyl phosphonic acid, tributyl phosphate, and combinations thereof.

16. The method of claim 15, further comprising separation of greater than 99% high purity La and Tb by solvent extraction with a solvent system comprising a solvent selected from the group consisting of Di-(2-ethylhexyl)phosphoric acid, 2-ethylhexyl 2-ethylhexyl phosphonic acid, and combinations thereof, after separation of Ce.

17. The method of claim 6, wherein the phosphor is not fired with an alkali material, such that no caustic fusion occurs.

18. The method of claim 6, wherein the method does not comprise an alkaline or acidic digestion step between leaching and precipitating.

19. The method of claim 6, wherein the rare earth constituent further comprises Gd.

20. The method of claim 6, wherein the pH of the rare earth leachate solution is adjusted to about 2.

21. The method of claim 6, wherein the one or more rare earth oxides is greater than 95% pure.

22. The method of claim 6, wherein the one or more rare earth oxides is at least 99% pure.

23. The method of claim 6, wherein the phosphor is a powder derived from phosphor waste.

24. The method of claim 6, wherein the pH of the rare earth leachate solution is adjusted to about 2.

25. A method for recovery of a rare earth constituent from a phosphor, the method comprising:
- leaching a rare earth constituent from a phosphor to form a rare earth leachate solution;
- adjusting the rare earth leachate solution to a pH preferential to the precipitation of rare earth oxalates relative to other metal oxalates, and then precipitating the rare earth constituent from the rare earth leachate solution as one or more rare earth oxalates; and
- converting the one or more rare earth oxalates to one or more rare earth oxides;
- wherein the rare earth constituent comprises compounds comprising a rare earth element selected from the group consisting of La, Ce, Eu, Tb, Y and combinations thereof; and
- wherein the leaching comprises a single stage of leaching La, Ce, Eu, Tb and Y-comprising compounds from the phosphor by an about 36N $H_2SO_4$.

26. The method of claim 25, wherein a high purity mixture of La, Ce, Eu, Tb, and Y oxides results.

27. The method of claim 25, wherein the one or more rare earth oxides is greater than 95% pure.

28. The method of claim 25, wherein the one or more rare earth oxides is at least 99% pure.

29. The method of claim 25, wherein the phosphor is a powder derived from phosphor waste.

30. The method of claim 25, wherein the rare earth constituent further comprises Gd.

31. The method of claim 25, further comprising separation and purification of individual rare earth oxides by solvent extraction or Zn reduction to achieve a high purity of greater than 99%.

* * * * *